United States Patent [19]
Taniwa et al.

[11] Patent Number: 5,664,094
[45] Date of Patent: Sep. 2, 1997

[54] METHOD AND APPARATUS FOR READ-WRITE-VERIFICATION OF DATA STORED ON AN OPTICAL DISC AND STORED IN A BUFFER OF AN OPTICAL DISK DRIVE

[76] Inventors: Shigeyuki Taniwa; Ichiro Iida, both c/o Canon Kabushiki Kaisha 3-30-2, Shimomaruko, Ohta-ku, Tokyo, Japan

[21] Appl. No.: 45,308

[22] Filed: Apr. 12, 1993

Related U.S. Application Data

[63] Continuation of Ser. No. 677,101, Mar. 29, 1991, abandoned.

[30] Foreign Application Priority Data

Apr. 3, 1990 [JP] Japan ................................. 2-88939
Apr. 24, 1990 [JP] Japan ................................ 2-107934

[51] Int. Cl.$^6$ ................................................ G06F 11/277
[52] U.S. Cl. .................. 395/183.18; 395/183.2; 395/185.07; 364/266.4; 364/265.3; 364/248.1; 364/249.4; 364/249.6
[58] Field of Search .................. 360/15, 53; 371/67.1, 371/51.1, 71, 21.2; 369/53, 54; 395/183.18, 183.2, 185.07

[56] References Cited

U.S. PATENT DOCUMENTS 3,801,968  4/1974  Way .................................. 360/40
3,805,284  4/1974  Coon, Jr. et al. ..................... 360/15
3,810,236  5/1974  Horowitz et al. ..................... 360/53
3,864,736  2/1975  Hazzard ............................. 360/53
4,740,942  4/1988  Ogino et al. ........................ 369/48
5,247,505  9/1993  Shikkhi et al. ...................... 369/54
5,267,100  11/1993  Ichijo et al. ....................... 360/53

Primary Examiner—Lance Leonard Barry, Esq.
Attorney, Agent, or Firm—Fitzpatrick, Cella, Harper & Scinto

[57] ABSTRACT

An information verifying apparatus for verifying information recorded on a recording medium. One unit of information input is recorded on a storage medium and is retrieved from the storage medium. A buffer memory stores the one unit of information input, the one unit of information stored in the buffer memory being the same as the one unit of information recorded on the storage medium. An output controller outputs the retrieved information and controls the timing of output of the retrieved information. A comparator compares the information from the buffer memory with the information from the output controller. Since the information is verified using a buffer memory and on output controller, verification can be quickly performed without the use of a large quantity of memory.

14 Claims, 10 Drawing Sheets

5,664,094

METHOD AND APPARATUS FOR READ-WRITE-VERIFICATION OF DATA STORED ON AN OPTICAL DISC AND STORED IN A BUFFER OF AN OPTICAL DISK DRIVE

This application is a continuation of application Ser. No. 07/677,101, filed Mar. 29, 1991, now abandoned.

BACKGROUND OF THE INVENTION

1. Field of the Invention

This invention relates to an information storage/reproducing apparatus which has a data comparison function to confirm that stored information has been correctly stored.

2. Description of the Related Art

FIG. 9 is a block diagarm showing the schematic configuration of a conventional information storage/reproducing apparatus.

In FIG. 9, an information storage/reproducing apparatus 42 is connected to a host computer 40 through an interface 41, and is controlled by the host computer 40.

The information storage/reproducing apparatus 42 comprises an interface unit 43 for connecting with the host computer 40, a buffer RAM (random access memory) 44 for temporarily holding data to be stored on a storage medium and data reproduced from the storage medium, and error correction circuit (hereinafter termed an ECC) 45 for correcting data.

The information storage/reproducing apparatus 42 further comprises a microprocessor (hereinafter termed a CPU) for controlling the entire apparatus, a ROM (read-only memory) 47 for holding programs for controlling the CPU 46, a work RAM 48 used during data processing by the CPU 46, a DMA (direct memory access) controller (hereinafter termed a DMAC) 49 for performing DMA transfer, a disk controller (hereinafter termed an ODC) 4A for handling stored data and reproduced data, and a MODEM (modulator-demodulator) 4B for performing modulation from data words to channel words, and demodulation from channel words to data words.

In addition, the information storage/reproducing apparatus 42 comprises a laser-diode driver (hereinafter termed an LDD) 4C which operates in accordance with a modulated output from the MODEM 4B, a laser-diode (hereinafter termed an LD) 4D driven by the LDD 4C, a photodetector (hereinafter termed a PD) 4E for detecting reflected light from a disk, a reproducing amplifier 4F for amplifying a reproduced signal from the photodetector PD 4E, a binary coding circuit 4G for digitizing the reproduced analog signal from the reproducing amplifier 4F, a PLL (phase-locked loop) circuit 4H for generating a reproducing clock signal from an output from the binary coding circuit 4G, a discriminator 4I for sampling the output from the binary coding circuit 4G with a clock signal from the PLL circuit 4H to provide channel words, and information storage medium (a magnetooptical disk in the present embodiment) 4J for storing information.

Data storage and reproducing processing will now be explained with reference to FIG. 9.

First, in storing data, the CPU 46 of the information storage/reproducing apparatus 42 prepares for the storage of data in response to a command from the host computer 40.

The host computer 40 transfers data to be stored to the information storage/reproducing apparatus 42 through the interface 41.

In accordance with control by the CPU 46, the information storage/reproducing apparatus 42 receives the above-described data through the host computer interface unit 43, and transfers the received data to the buffer RAM 44, where the data is held. Subsequently, when preparation for storage, such as searching for the information storage medium 4J, for example, has been completed in accordance with commands from the CPU 46, the CPU 46 commands the ODC 4A to transfer the data. In accordance with this command, the data to be stored is transferred from the buffer RAM 44 to the MODEM 4B via the ODC 4A.

The ECC 45 generates an error correcting code in synchronization with the transfer of the data to be stored. The ODC 4A transfers the error correcting code generated by the ECC 45 to the MODEM 4B in addition to the data to be stored.

The MODEM 4B modulates the data, and transmits the modulated data to the LDD 4C in the form of channel words. The LDD 4C drives the LD 4D of an optical head to store the data on the information storage medium 4J.

Next, an explanation will be provided for the data reproducing processing. As in storage processing, the host computer 40 and the CPU 46 of the information storage/reproducing apparatus 42 prepare for reproducing processing of data by exchanging commands.

The CPU 46 makes the optical head seek the position of data to be reproduced on the disk, and notifies the ODC 4A of a target sector.

After the completion of seek, a signal read from the information storage medium 4J by the PD 4E of the optical head is input to the reproducing amplifier 4F, where the signal is amplified. An output from the reproducing amplifier 4F is converted from an analog signal into a digital signal by the binary coding circuit 4G, and the converted digital signal is input to the discriminator 4I and the PLL circuit 4H.

The PLL circuit 4H generates a reproducing clock signal in accordance with the input signal, and transmits a clock signal to the discriminator 4I. The discriminator 4I samples the signal from the binary coding circuit 4G based on the clock signal from the PLL circuit 4H, and inputs the sampled signal to the MODEM 4B, where the reproduced signal is demolulated to become data words, which are transferred to the buffer RAM 44 and the ECC 45 by the ODC 4A.

The error correcting code is not transferred to the buffer RAM 44. If an error is present in the data, the ECC 45 corrects wrong data in the buffer RAM 44. The CPU 46 outputs the data within the buffer RAM 44 to the interface 41 and the host computer 40 reads the data.

FIG. 10 is a block diagram illustrating the concept of comparison in the above-described conventional apparatus.

In FIG. 10, areas 440 and 441 are storage areas obtained by dividing the buffer RAM 44 into two areas.

First path 401 is a path from the host computer interface unit 43 to the first storage area 440 of the buffer RAM 44. Second path 402 is a path from the MODEM 4B to the second storage area 441 of the buffer RAM 44 via the ODC Third path 403 is a path from the first storage area 440 of the buffer RAM 44 to the ODC 4A. Fourth path 404 is a path from the second storage area 441 of the buffer RAM 44 to the ODC 4A. Fifth path 405 is a path from the ODC 4A to the CPU 46.

Data comparison means 5 is provided within the ODC 4A.

FIG. 11 is a flowchart showing a comparison operation in the conventional apparatus.

In this flowchart, when a comparison operation has been started (S70) after data storage of one unit, host computer data are first input from the host computer interface unit 43 to the first storage area 440 of the buffer RAM 44 through the first path 401 (S71), the host computer data having been input from the host computer 40 to the information storage/reproducing apparatus 42 through the interface 41, as described above.

Next, data read from the disk are input from the MODEM 4B to the second storage area 441 of the buffer RAM 44 through the second path 402 (S72).

Steps S71 and S72 may be reversed in some cases.

When data have been stored in the entire respective areas, or a necessary amount of data have been stored, the process proceeds to the next processing step.

That is, first, data of a unit (usually one byte or a few bytes) from the host computer interface 41 are input from the first storage area 440 of the buffer RAM 44 to the comparison means 5 within the ODC 4B through the third path 403 (S73). Next, host computer data of one unit (having an amount equal to the amount of the above-described data handled through the third path 403) are input from the second storage area 441 of the buffer RAM 44 to the comparison means 5 within the ODC 4B through the fourth path 404 (S74).

The comparison means 5 compares data for every unit (S75). If the two data do not coincide as a result of the comparison, the CPU 46 is notified of the fact by means of interrupt processing through the fifth path 405 (S76).

Such comparison is executed for a predetermined amount of data (S77). After the completion of comparison, the process proceeds to the next processing step (S78).

In the above-described conventional processing, however, since respective data to be compared must first be stored in the buffer RAM 44 before performing data comparison, much time is needed for comparison.

Furthermore, the maximum number of data which can be compared at a time is about half the capacity of the buffer RAM, and hence efficiency is low.

Such problems reduce the efficiency of a job in the usual apparatus, and greatly influence the cost of an information storage medium considering that such information storage/reproducing apparatus may also be used for quality inspection during production of information storage media and thus the time required for production is increased.

SUMMARY OF THE INVENTION

It is an object of the present invention to provide an improved information storage/reproducing apparatus in which the above-described disadvantages have been removed.

It is a further object of the present invention to provide an information storage/reproducing apparatus which can effeciently perform data comparison by storing one of the data to be stored from a host computer and data reproduced from a storage medium in a buffer, and comparing the respective data with each other while synchronizing the other data with a reading operation from the buffer.

It is still a further object of the present invention to provide an information storage/reproducing apparatus which can efficiently perform data comparison by synchronizing the transfer of at least one of the data to be stored from a host computer and data reproduced from a storage medium with comparison means, and directly inputting the data to the comparison means.

It is still another object of the present invention to provide an information storage/reproducing apparatus which can correctly check a buffer RAM used for data comparison and the like.

It is still a further object of the present invention to provide an information storage/reproducing apparatus which can correctly check a buffer RAM used for data comparison and the like using a plurality of data paths.

These and other objects of the present invention will become more apparent from the following description in connection with the accompanying drawings, and the appended claims.

DETAILED DESCRIPTION OF THE PREFERRED EMBODIMENTS

Figure 1:
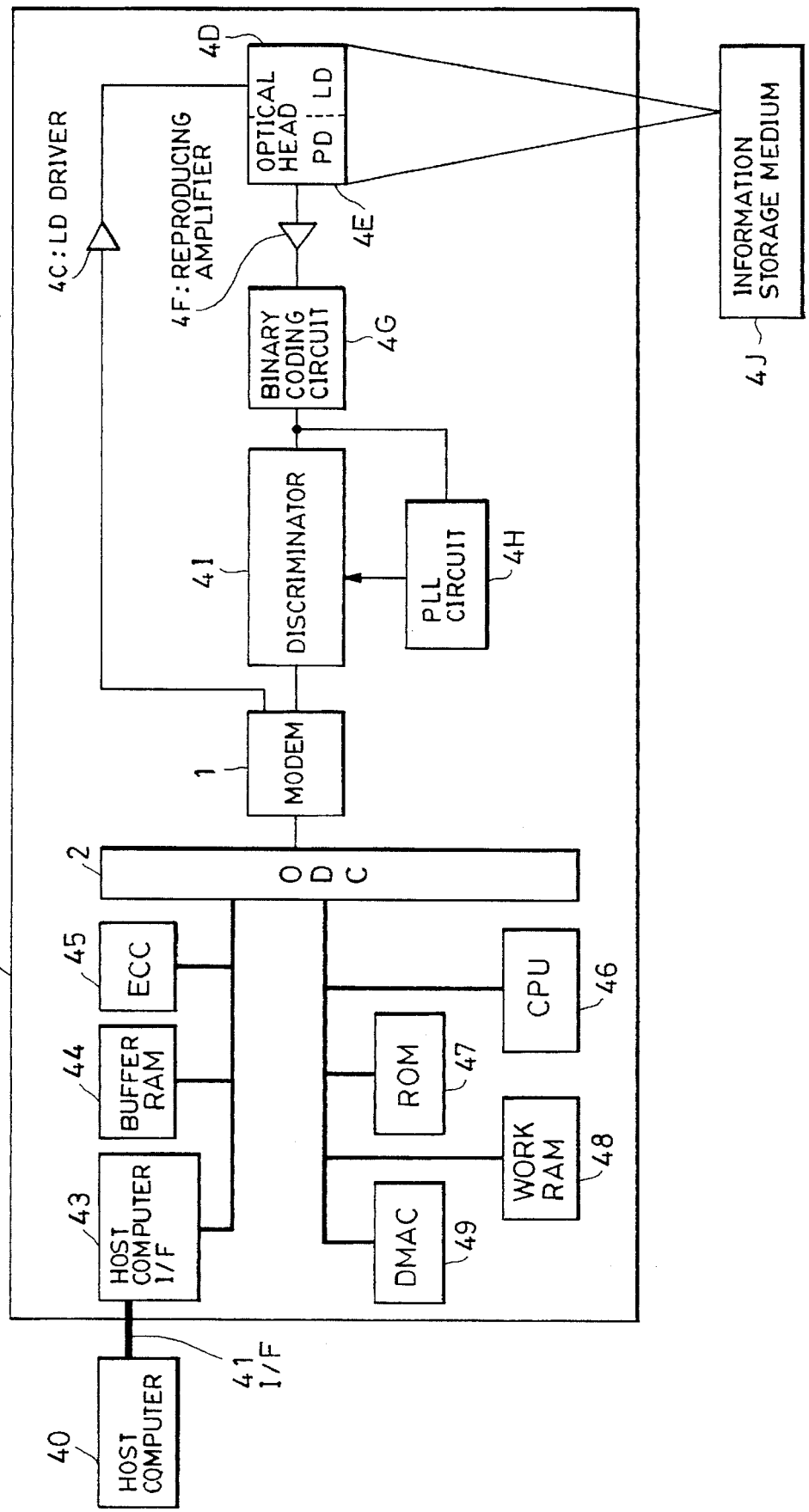
FIG. 1 is a block diagram showing an information storage/reproducing apparatus according to a first embodiment of the present invention.

FIG. 1 is a block diagram showing an information storage/reproducing apparatus according to a first embodiment of the present invention.

The information storage/reproducing apparatus 1 includes an ODC 2 having a comparison function wherein at least one of two data to be compared by the comparison means 5 is directly input to the comparison means 5 without being stored in the buffer RAM 44. Other blocks are identical to those shown in the above-described conventional apparatus.

Accordingly, in the present embodiment, operations other than data comparison are identical to those in the conventional apparatus. Hence, an explanation will only be provided of data comparison.

Figure 2:
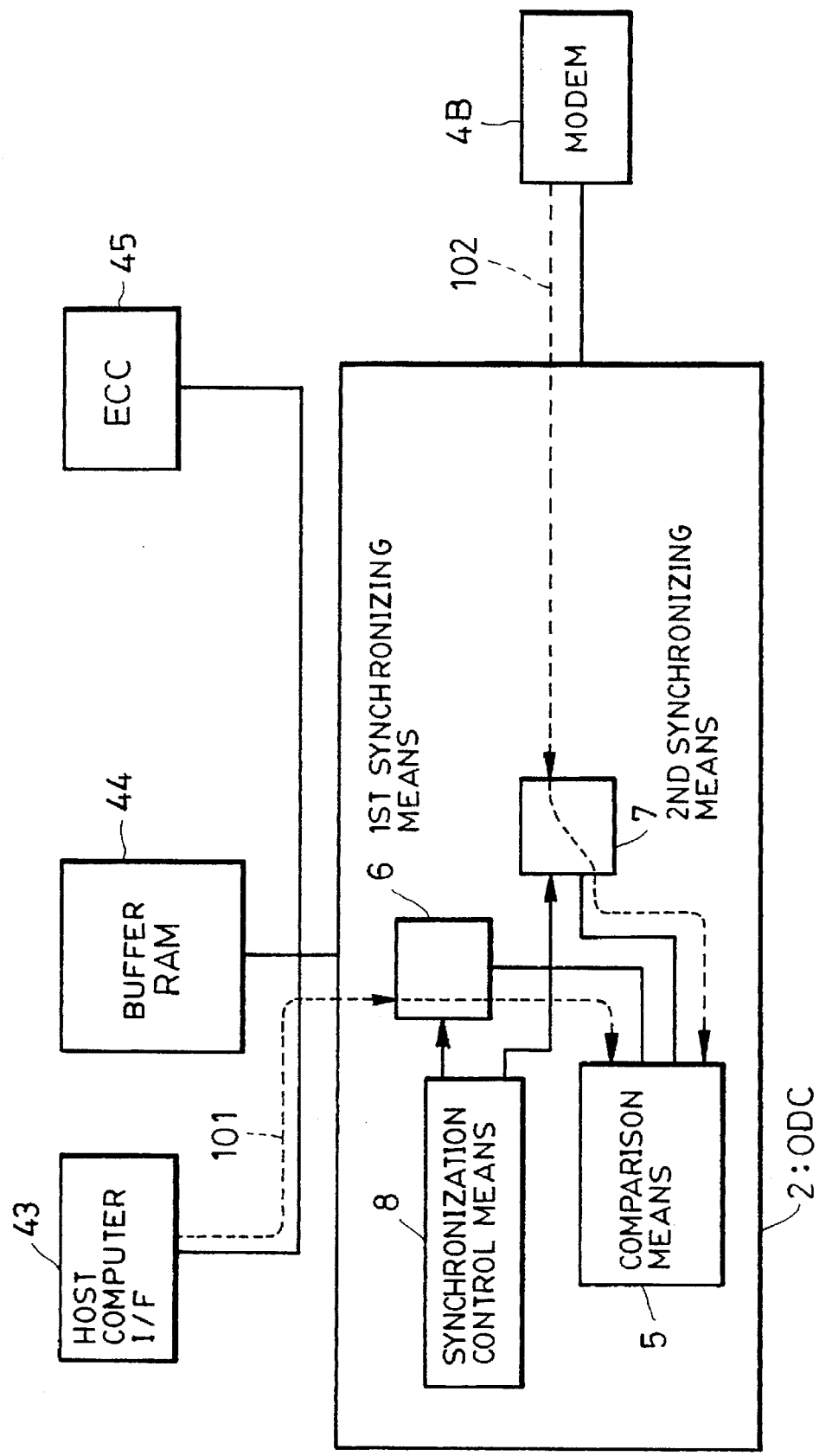
FIG. 2 is a block diagram illustrating the concept of comparison in the first embodiment.

FIG. 2 is a block diagram illustrating the concept of comparison in the first embodiment.

In FIG. 2, the comparison means compares data from the host computer 40 with data reproduced from the information storage medium 4J.

First synchronizing means 6 adjusts timing to transfer data from the host computer interface unit 43 to the comparison means 5.

Second synchronizing means 7 adjusts timing to transfer disk data from the MODEM 4B to the comparison means 5.

Fifth data path 101 is a path from the host computer interface unit 43 directly to the comparison means 5 within the ODC 2. Sixth data path 102 is a path from the MODEM 4B directly to the comparison means 5 within the ODC 2.

Data comparison is performed in the following way.

After the storage of one unit of data on the storage medium 4J, the ODC 2 first inputs the same data from the host computer 40 from the host computer interface unit 43 to the first synchronizing means 6 through the fifth data path 101.

The first synchronizing means 6 transfers the data in synchronization with a comparison operation of the comparison means 5.

Further, the ODC 2 inputs one unit of disk data from the MODEM 4B to the second synchronizing means 7 through the sixth data path 102.

The second synchronizing means 7 transfers the data in synchronization with a comparison operation of the comparison means 5.

The synchronizing means 6 and 7 are synchronized with each other by synchronization control means 8.

Each of the synchronizing means 6 and 7 may be simply realized by a memory, such as a FIFO (first-in first-out) or the like.

Thus, the two kinds of data input to the comparison means 5 are compared with each other with correct timing. If the two kinds of data differ as a result of the comparison, the fact is notified to the CPU 46 by means of an interrupt or the like.

Figure 3:
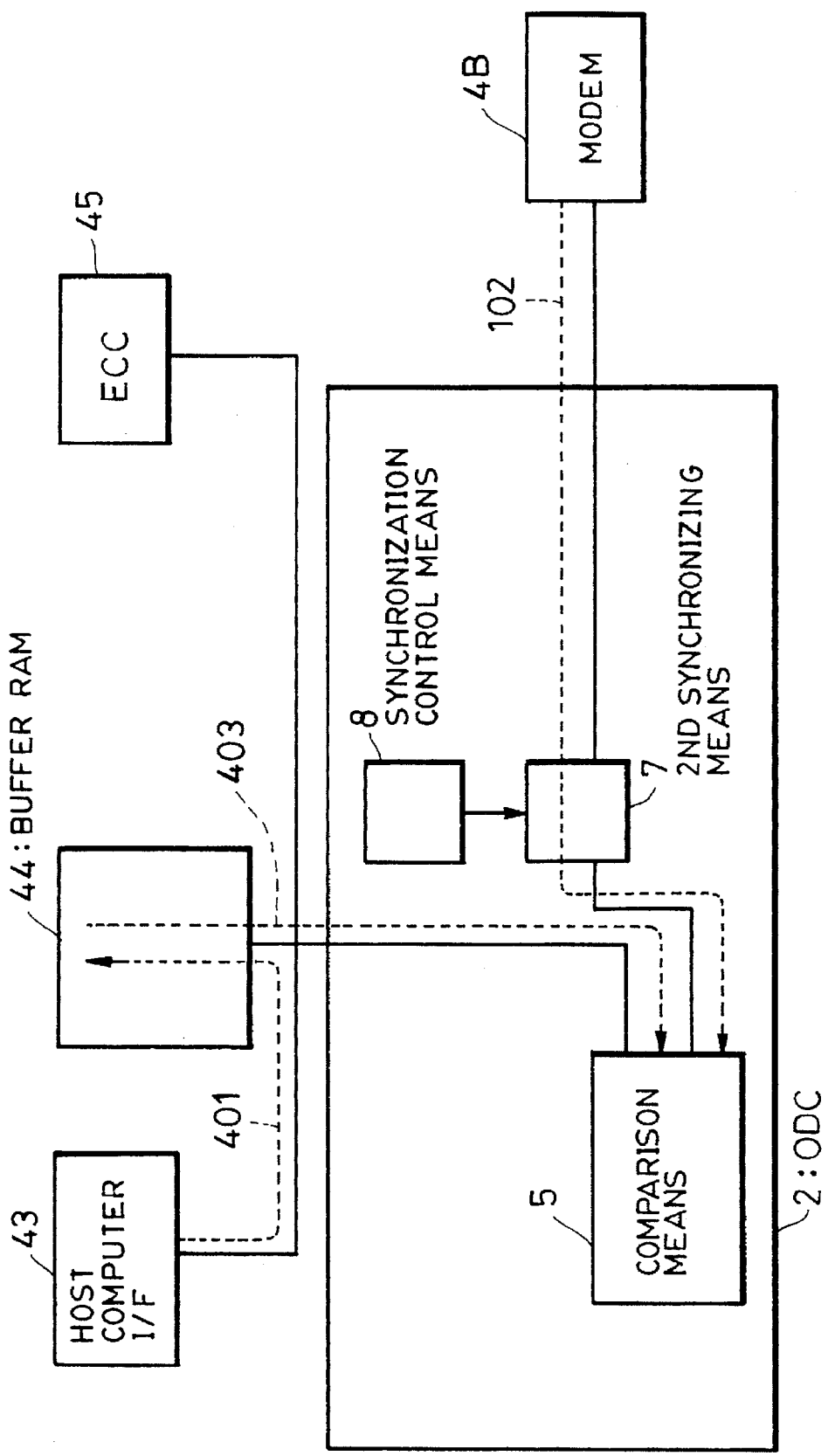
FIG. 3 is a block diagram illustrating the concept of comparison in a second embodiment of the present invention.

FIG. 3 is a block diagram illustrating the concept of comparison in a second embodiment of the present invention.

In the second embodiment, the timing synchronizing means 6 is removed from the configuration of the first embodiment shown in FIG. 2.

In the second embodiment, data comparison is performed in the following way.

After the storage of data of one unit on the storage medium 4J, the ODC 2 inputs the same data from the host computer 40 from the host computer interface unit 43 to the buffer RAM 44 through the first data path 401.

Subsequently, the ODC 2 inputs disk data from the MODEM 4B to the second synchronizing means 7 through the sixth data path 102. The synchronization control means 8 controls data transfer from the second synchronizing means 7 to the comparison means 5 so as to be synchronized with the transfer of the disk data from the buffer RAM 44 to the comparison means 5.

Subsequently, the two kinds of data input to the comparison means 5 are compared with each other in the same way as in the first embodiment. If the two kinds of data differ as a result of the comparison, the fact is notified to the CPU 46 by means of interrupt or the like.

As an alternative of inputting host computer data to the buffer RAM 44 when starting data comparison, one unit of data input to the buffer RAM 44 may be held during data storage on the storage medium 4J, and the data may be transmitted to the comparison means 5.

Figure 4:
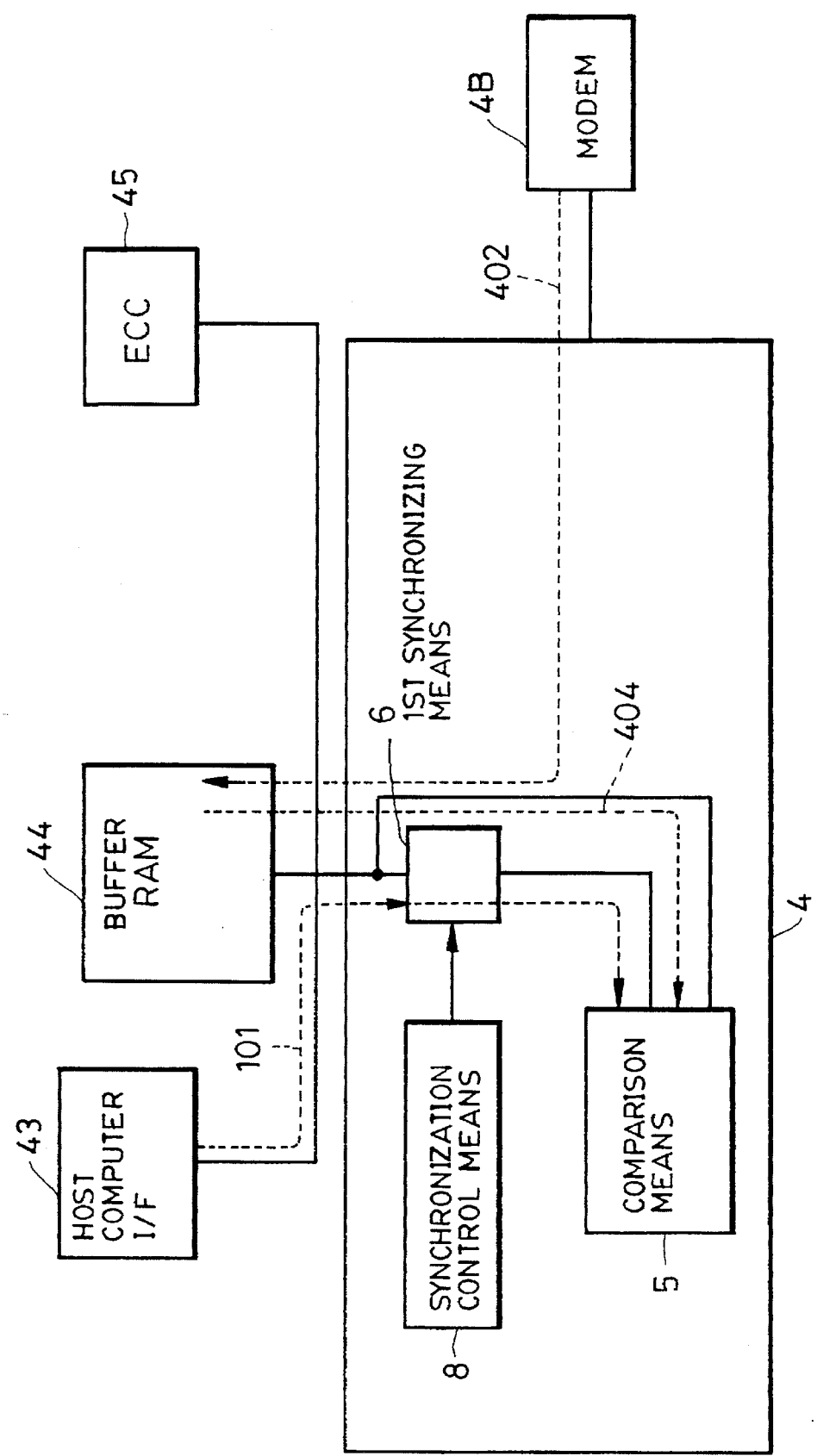
FIG. 4 is a block diagram illustrating the concept of comparison in a third embodiment of the present invention.

FIG. 4 is a block diagram illustrating the concept of comparison in a third embodiment of the present invention.

In the third embodiment, the timing synchronizing means 7 is removed from the configuration of the first embodiment shown in FIG. 2.

In the third embodiment, data comparison is performed in the following way.

After the storage of one unit of data on the storage medium 4J, the ODC 2 inputs disk data having a predetermined capacity from the MODEM 4B to the buffer RAM 44 through the second data path 402.

Subsequently, the ODC 2 inputs host computer data which are the same as the data stored on the storage medium 4J from the host computer interface unit 43 to the synchronizing means 6 through the fifth data path 101. The synchronization control means 8 controls data transfer from the synchronizing means 6 to the comparison means 5 so as to be synchronized with the transfer of host computer data from the buffer RAM 44 to the comparison means 5.

Subsequently, the two kinds of data input to the comparison means 5 are compared with each other in the same manner as in the first embodiment. If the two kinds of data differ as a result of the comparison, the CPU 46 is notified of the fact by means of an interrupt or the like.

As explained above, at least one of two kinds of data to be compared need not be stored in the buffer RAM 44 before comparison. Hence, the present embodiments have the effect that the time needed for data comparison can be reduced.

For example, when host computer data are not stored in the buffer RAM, the time is about 65% shorter than in the conventional approach.

Alternatively, with the same capacity of the buffer RAM as that of the conventional apparatus, data whose amount is as large as the capacity of the buffer RAM, that is, twice the amount in the conventional apparatus, can be compared at a time. Hence, the present embodiments have the effect of increasing efficiency.

Furthermore, if the information storage/reproducing apparatus of the present embodiments is used for quality inspection in the production of information storage media, the time needed for inspection can be shortened. Hence, it becomes possible to reduce the cost of an information storage medium.

When data comparison and the storage/reproduction of information is performed using the buffer RAM 44 in the above-described information storage/reproducing apparatus, memory cells constituting the buffer RAM 44 must be normal.

Figure 5:
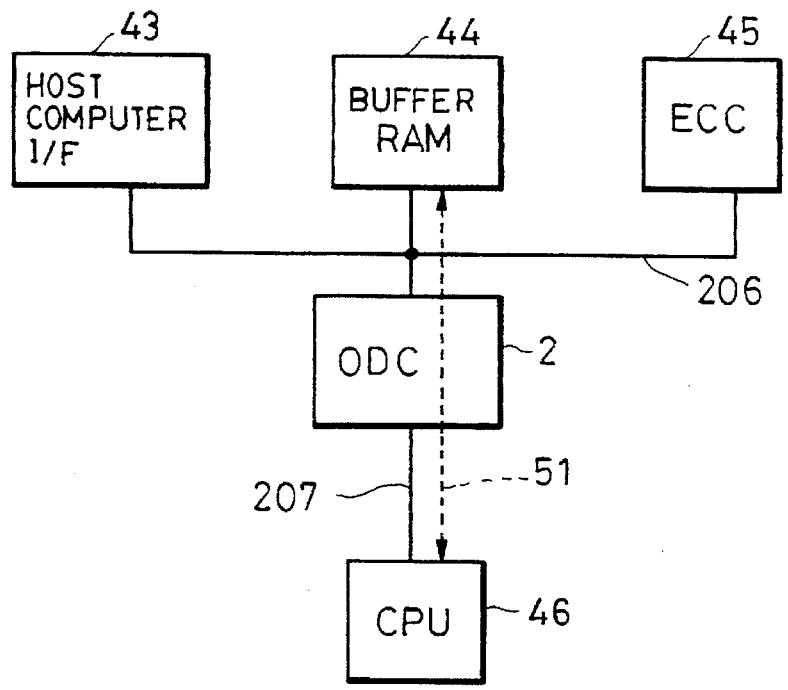
FIG. 5 is a block diagram illustrating the concept of a conventional buffer memory check mechanism.

FIG. 5 shows the concept of a buffer memory check mechanism.

In FIG. 5, broken line 51 indicates a path from the CPU 46 to the buffer RAM 44 through CPU bus 207, the ODC 2 and buffer bus 206. This path is used for the check by the CPU 46 whether or not each memory cell constituting the buffer RAM 44 is normal. This path is hereinafter termed a first check path.

In the method shown in FIG. 5, however, in order to check a memory cell of the buffer RAM 44, the CPU 46 must perform the check through the ODC 2.

Accordingly, the method has the problem that when a result of the check indicates abnormal, it is not clear whether a memory cell of the buffer RAM 44 is abnormal or a function of the ODC 2 is abnormal.

This problem is a factor that increases the time needed for final check at shipment in the production step, causing a great increase in the production cost. Furthermore, in the market, a self check operation when supplying power becomes insufficient, greatly decreasing the reliability of the apparatus.

An explanation will now be provided of an information storage/reproducing apparatus which can more correctly check a buffer memory.

Figure 6:
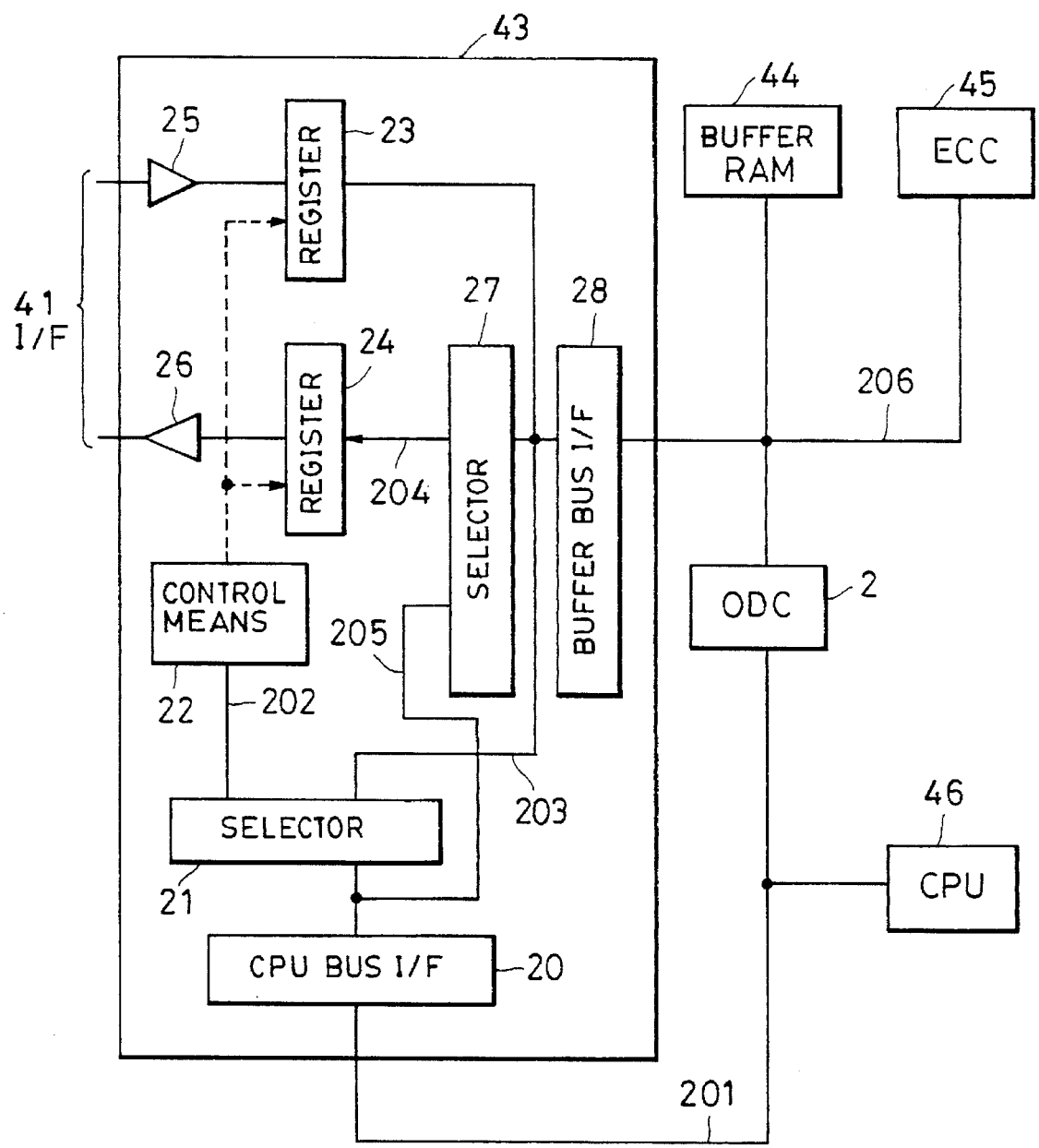
FIG. 6 is a block diagram showing the configuration of a host computer interface in the embodiments.

FIG. 6 is a block diagram showing the configuration of a host computer interface unit 43.

The host computer interface unit 43 comprises an interface 20 with CPU bus 201, a register 23 for holding data input from a host computer 40 through an interface 41, a register 24 for holding data output to the host computer 40 through the interface 41, register control means 22 for controlling the registers 23 and 24, an input buffer 25 for an input from the interface 41 to the register 23, an output buffer 26 for an output from the register 24 to the interface 41, and an interface 28 with buffer bus 206. These components are used for a normal storage/reproducing operation.

The host computer interface unit 43 also comprises a selector 21 for selecting the path of a signal input from the CPU bus 201, and a selector 27 for selecting the path of a signal input from the buffer bus 206. The host computer interface unit 43 further includes signal line 202 from the selector 21 to the register control means 22, signal line 203 from the selector 21 to the buffer bus interface 28, signal line 204 from the selector 27 to the register 24 for output, and signal line 205 from the selector 27 to the CPU bus interface 20.

In a normal storage/reproducing operation, the selector 21 selects the signal line 202, and the selector 27 selects the signal line 204. Accordingly, the CPU bus 201 is connected to the register control means 22, and the buffer bus 206 is connected to the register 24 for holding data to be output to the host computer interface 41.

In this state, the same storage/reproducing operation as in the foregoing method is performed.

In checking the buffer RAM 44, the selector 21 selects the signal line 203, and the selector 27 selects the signal line 205. Accordingly, the CPU bus 201 is connected to the buffer bus interface 28, and the buffer bus 208 is connected to the CPU bus interface 20.

Figure 7:
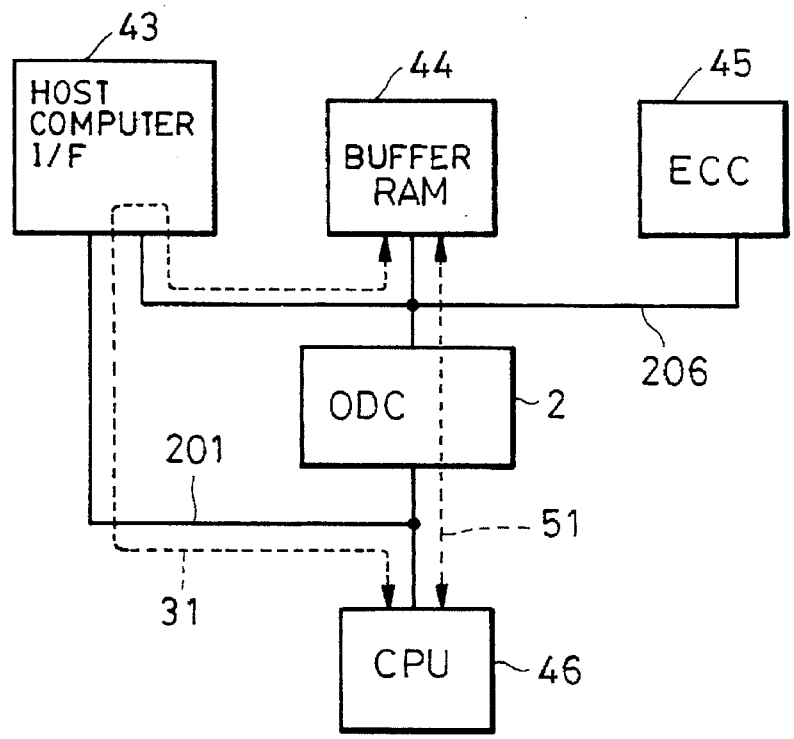
FIG. 7 is a block diagram showing the concept of a buffer memory check mechanism in the embodiments.

FIG. 7 is a block diagram illustrating the concept of a buffer memory check mechanism of the present embodiment.

That is, in the present embodiment, as shown in FIG. 7, in addition to a first path 51 from the CPU 46 to the buffer RAM 44 through the ODC 2, a second path 31 from the CPU 46 to the buffer RAM 44 through the host computer interface unit 43 is present. By using the second path 31, a memory cell of the buffer RAM 44 can be checked without passing through the ODC 2.

In such a configuration, a memory cell of the buffer RAM 44 is checked in the following way.

Figure 8:
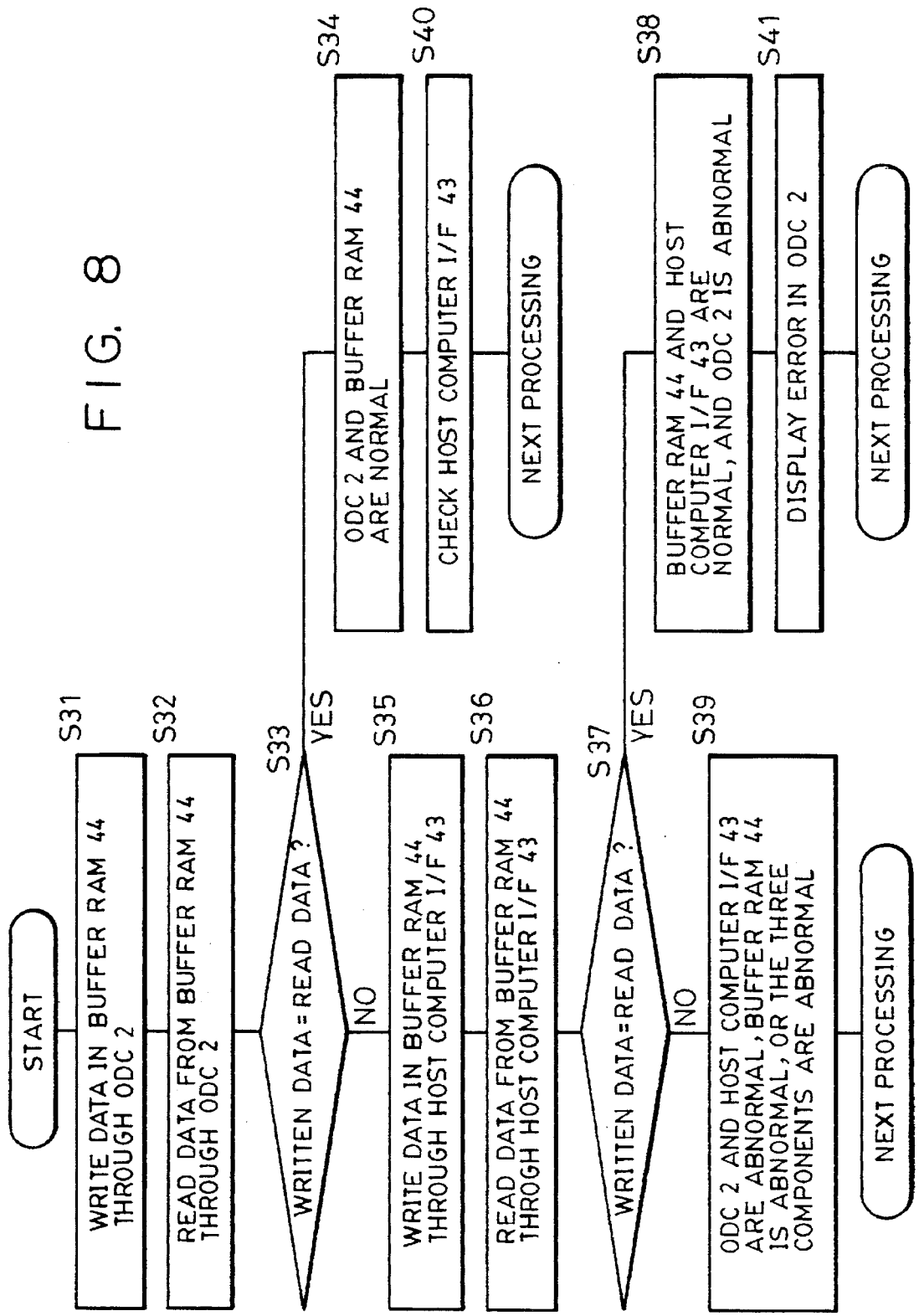
FIG. 8 is a flowchart showing a buffer memory check operation in the embodiments.
Figure 9:
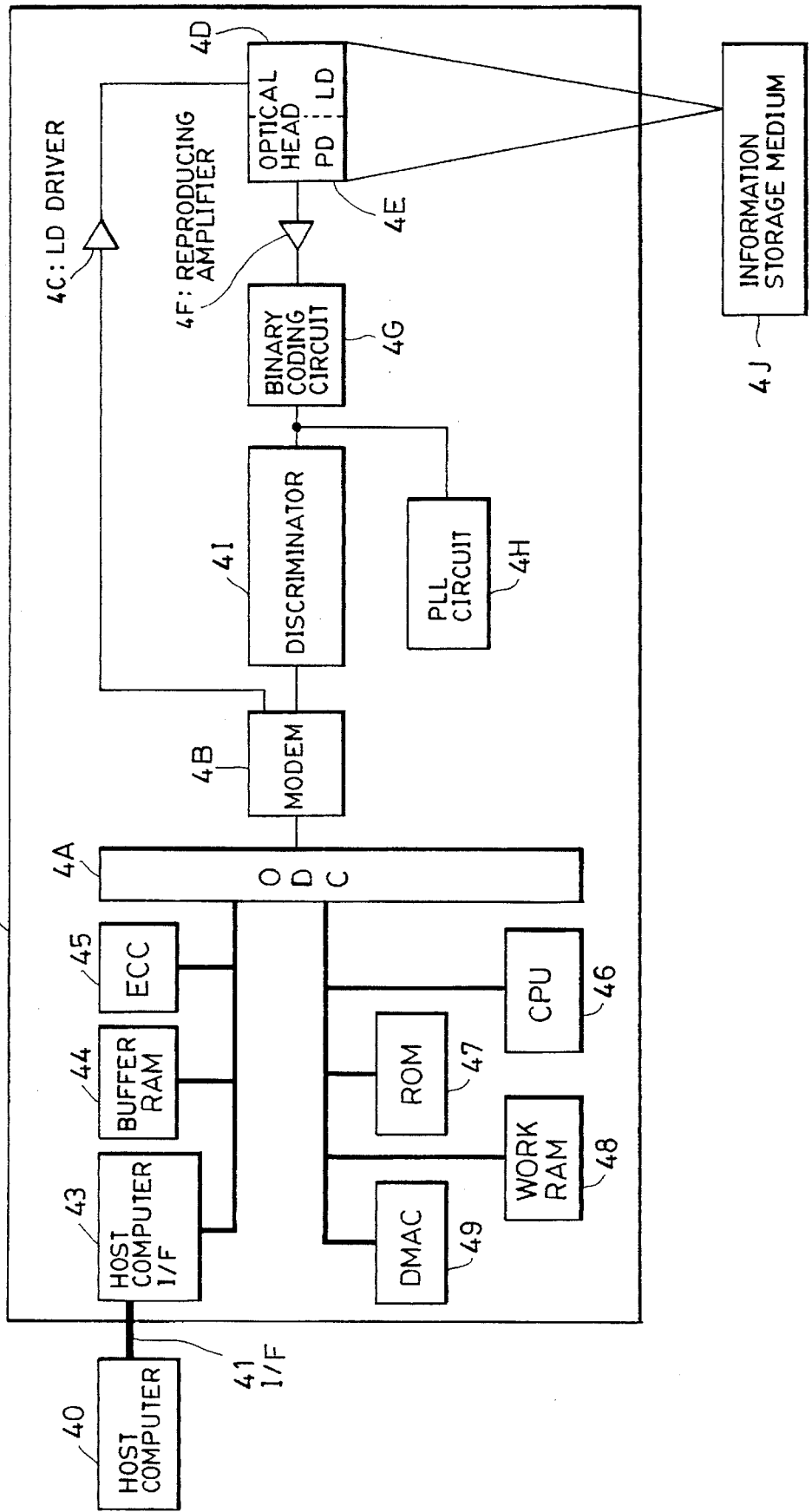
FIG. 9 is a block diagram showing a conventional information storage/reproducing apparatus.
Figure 10:
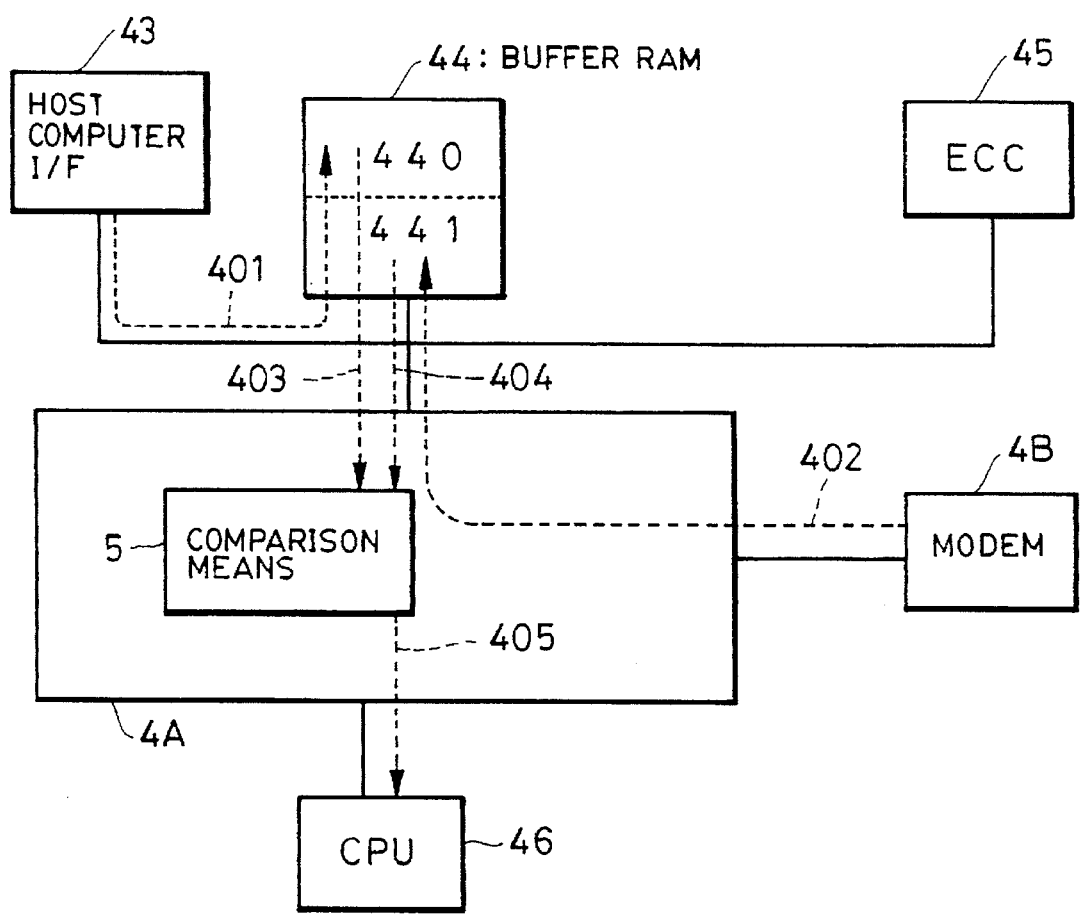
FIG. 10 is a block diagram illustrating the concept of comparison in the conventional apparatus.
Figure 11:
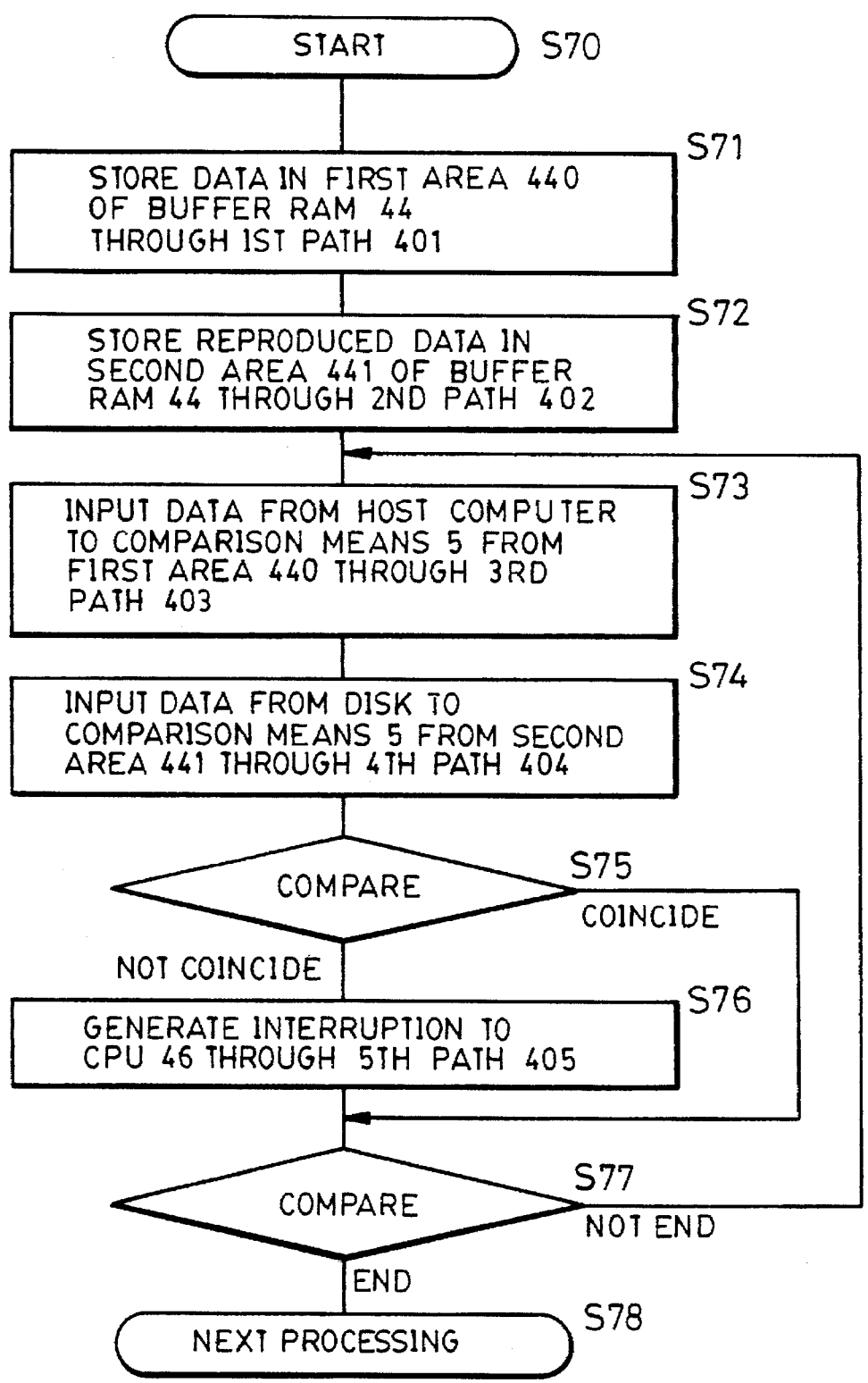
FIG. 11 is a flowchart showing a comparison operation in the conventional apparatus.

FIG. 8 is a flowchart showing a buffer memory check operation of the present embodiment.

First, the CPU 46 writes data in the buffer RAM 44 through the ODC 2 (S31). The data to be written, for example, could be "AAH", "55H" or the like. The data to be written changes according to an object, such as checking which memory cell in the buffer RAM 44 has a failure, which address line or data line has a failure, or the like. In any case, only one pattern is used for one check.

Subsequently, the data written in the buffer RAM 44 at step S31 are sequentially read (S32), and the read data and written data are compared with each other(S33). If the two kinds of data coincide in all the memory cells as a result of the comparison, the result indicates that both the ODC 2 and the buffer RAM 44 are normal (S34).

The first check path 51, in FIG. 7, is used until this step.

If the two kinds of data do not coincide in any memory cell as a result of the comparison at the above-described step S33, the process proceeds to step S35. At that time, as described above, the host computer interface unit 43 is in a state wherein the second check path 31 has been secured by the switching operation of the selectors 21 and 27.

First, at step S35, the CPU 48 writes data in the buffer RAM 44 through the host computer interface unit 43. That is, the CPU 46 transmits the data to the CPU bus interface 20 within the host computer interface unit 43 through the CPU bus 201. The data are input to the selector 21, from which the data are transmitted to the buffer bus interface 28 through the signal line 203. The data are then output to the buffer bus 206 through the buffer bus interface 28, and are written in the buffer RAM 44. As described above, only one pattern is used for the data.

Subsequently, the data written in the buffer RAM 44 are sequentially read (S36). The flow of the data in this reading operation is reversed with respect to the flow in the above-desribed writing operation. That is, the data read from the buffer RAM 44 are input to the selector 27 through the buffer bus interface 28 within the host computer interface unit 43, and are transmitted to the CPU bus interface 20 through signal line 205. The data are then output to the CPU bus 201, and are temporarily stored in the CPU 46 or the work RAM 48.

The read data and the written data are compared with each other (S37). If the two kinds of data coincide in all the memory cells as a result of the comparison (S38), that indicates that the ODC 2 is abnormal. In this case, the process proceeds to an error processing routine indicating that the ODC 2 is abnormal.

If the two kinds of data do not coincide, three cases may be considered: that is, both the ODC 2 and the host computer interface unit 43 are abnormal, the buffer RAM 44 is abnormal, or all three components are abnormal (S39). The probability that all three components are abnormal is low. In order to determine which component among the three components actually has a failure, data reproduced from the storage medium may, for example, be input to the ODC 2, or data may be transferred from the host computer 40 to the host computer interface unit 43, to determine that the ODC 2 has a failure, or the host computer interface unit 43 has a failure, respectively. In any case, the process proceeds to another processing from this step.

Although the present embodiment has the disadvantage that the speed to transfer data from the CPU 46 to the buffer RAM 44 through the ODC 2 is low, data can be transferred at a sufficiently high speed during access through the host computer interface unit 43 because of its simple configurtion.

Accordingly, by using the first check path 51 for only a few memory cells in the buffer RAM 44, and using the second check path 31 for the other memory cells, it becomes possible to perform a high-speed buffer check.

In the foregoing embodiment, the first check path 51 and the second check path 31 are selected using the selectors 21 and 27 so that each path is alternatively set. However, the second check path 31 may be set to perform a check in the state that the first check path 51 has been set. In this case, circuitry to switch signal paths may be used in place of the selectors 21 and 27.

As explained above, in addition to a conventional buffer memory check, it is also possible to perform a check using a path through the host computer interface unit. Hence, the present embodiment has the effect of increasing the correctness in a buffer memory check.

Furthermore, even if the ODC is abnormal, it is possible to perform a memory check using a path through the host computer interface unit. Hence, the present embodiment has the effect that it is possible to make it clear that the ODC is abnormal as a result of the check.

As a result, it is possible to shorten the time for final check in shipment, and reduce the production cost. Furthermore, it is also possible to increase reliability during self check when supplying power.

The present invention is not limited to the above-described embodiments, but various changes and modifications may be made within the true spirit and scope of the invention.

What is claimed is:

1. An information verifying apparatus, comprising:

input means for inputting one unit of information to be recorded on a storage medium;

a buffer memory for storing the one unit of information input by said input means;

recording means for recording the one unit of information stored in said buffer memory on the storage medium;

reading means for reading out information which has been recorded on the storage medium for verification;

output control means for inputting information read-out by said reading means, outputting said read-out information, and for controlling a timing of output of the read-out information;

comparison means for comparing information outputted from said buffer memory, which is recorded on said storage medium, with the information output from said output control means;

control means for determining whether one unit of information is correctly recorded on the storage medium on the basis of the result of the comparison by said comparison means, wherein said output control means outputs the read-out information synchronously with a transfer of information from said buffer memory to said comparison means; and checking means for checking an abnormal condition of said buffer memory by recording predetermined data on said buffer memory, by reading out the data, and by comparing said predetermined data with the read-out data.

2. An information verifying apparatus according to claim 1, wherein said checking means has a first mode for checking through a first data path and a second mode for checking through a second data path.

3. An apparatus according to claim 2, further comprising a storage/reproduction control unit for controlling said apparatus, wherein said first data path passes through said storage/reproduction control unit and said second data path does not pass through said storage/reproduction control unit.

4. An apparatus according to claim 2, further comprising an interface unit for controlling input of information to be stored from the outside and output of reproduced information to the outside, wherein said second data path passes through said interface unit and said first data path does not pass through said interface unit.

5. An information verifying apparatus, comprising:

input means for inputting one unit of information to be recorded on a storage medium;

a buffer memory for storing the one unit of information inputted by said input means;

recording means for recording the one unit of information stored in said buffer memory on the storage medium;

reading means for reading out information which has been recorded on the storage medium for verification and recording information on said buffer memory;

output control means for inputting information which is the same as one unit of information recorded on said storage medium and controlling a timing of output of inputted information;

comparison means for comparing information output from said buffer memory with the information output from said output control means;

control means for determining whether one unit of information is correctly recorded on the storage medium on the basis of the result of the comparison by said comparison means, wherein said output control means outputs the information synchronously with a transfer of information from said buffer memory to said comparison means; and checking means for checking an abnormal condition of said buffer memory by recording predetermined data on said buffer memory, by reading out the data, and by comparing said predetermined data with the read-out data.

6. An information verifying apparatus according to claim 5, further comprising checking means for checking an abnormal condition of said buffer memory by recording predetermined data on said buffer memory by reading out the data, and by comparing said predetermined data with the read-out data, said checking means having a first mode for checking through a first data path and a second mode for checking through a second data path.

7. An information verifying apparatus according to claim 6, further comprising a storage/reproduction control unit for controlling said apparatus, wherein said first data path passes through said storage/reproduction control unit and said second data path does not pass through said storage/reproduction control unit.

8. An information verifying apparatus according to claim 6, further comprising an interface unit for controlling input of information to be stored from the outside and output of reproduced in formation to the outside, wherein said second data path passes through said interface unit and said first data path does not pass through said interface unit.

9. An information verifying apparatus, comprising:

input means for inputting one unit of information to be recorded on a storage medium;

recording means for recording the one unit of information inputted by said input means on the storage medium;

reading means for reading out information which has been recorded on the storage medium for verification;

output control means for inputting one of information read-out by said reading means and information which is the same as the one unit of information recorded on said storage medium, outputting said read-out information, and for controlling a timing of output of inputted information;

a buffer memory for storing information;

comparison means for comparing information outputted from said buffer memory with the information output from said output control means;

control means for determining whether the one unit of information is correctly recorded on the storage medium on the basis of the result of the comparison by said comparison means, wherein said output control means outputs the information synchronously with a transfer of information from said buffer memory to said comparison means; and checking means for checking an abnormal condition of said buffer memory by recording predetermined data on said buffer memory, by reading out the data, and by comparing said predetermined data with the read-out data.

10. An information verifying apparatus according to claim 9, wherein said checking means has a first mode for checking through a first data path and a second mode for checking through a second data path.

11. An information verifying apparatus, comprising:

input means for inputting one unit of information to be recorded on a storage medium;

a buffer memory for storing the one unit of information input by said input means;

recording means for recording the one unit of information stored in said buffer memory on the storage medium;

reading means for reading out information which has been recorded on the storage medium for verification;

output control means for inputting read-out information, outputting said read-out information, and controlling a timing of output of the read-out information;

comparison means for comparing information outputted from said buffer memory, with the information output from said output control means;

control means for determining whether one unit of information is correctly recorded on the storage medium on the basis of the result of the comparison by said comparison means, wherein said output control means outputs the information synchronously with a transfer of information from said buffer memory to said comparison means; and checking means for checking an abnormal condition of said buffer memory by recording predetermined data on said buffer memory, by reading out the data, and by comparing said predetermined data with the read-out data.

12. A method of verifying information, comprising the steps of:

inputting one unit of information to be recorded on a storage medium;

storing the one unit of information input in said inputting step in a buffer memory;

recording the one unit of information stored in the buffer memory on the storage medium;

reading out information which has been recorded on the storage medium for verification;

outputting the information read-out in said reading step and controlling a timing of output of the read-out information;

comparing the information stored in the buffer memory with the information outputted in said outputting step;

determining whether one unit of information is correctly recorded on the storage medium on the basis of the result of the comparison in the comparison step, wherein said outputting step includes outputting the read-out information synchronously with a transfer of information from the buffer memory; and checking an abnormal condition of the buffer memory by recording predetermined data on the buffer memory, by reading out the data, and by comparing the predetermined data with the read-out data.

13. A method of verifying information, comprising the steps of:

inputting one unit of information to be recorded on a storage medium;

storing the one unit of information inputted in said inputting step in a buffer memory;

recording the one unit of information on the storage medium;

reading out information which has been recorded on the storage medium for verification and recording information on the buffer memory;

outputting information that has been inputted which is the same as one unit of information recorded on the storage medium and controlling a timing of said outputting;

comparing information outputted from the buffer memory with the information outputted in said outputting step;

determining whether one unit of information is correctly recorded on the storage medium on the basis of the result of said comparing step, wherein said outputting step outputs the information synchronously with a transfer of information from the buffer memory; and checking an abnormal condition of the buffer memory by recording predetermined data on the buffer memory, by reading out the data, and by comparing the predetermined data with the read-out data.

14. A method of verifying information, comprising the steps of:

inputting one unit of information to be recorded on a storage medium;

storing the one unit of information inputted in said inputting step in a buffer memory;

recording the one unit of information stored in the buffer memory on the storage medium;

reading out information which has been recorded on the storage medium for verification;

outputting the information read-out in said reading step and controlling a timing of output of the read-out information;

comparing information outputted from the buffer memory with the information outputted in said outputting step;

determining whether one unit of information is correctly recorded on the storage medium on the basis of the result of the comparing step, wherein said outputting step includes outputting the information synchronously with a transfer of information from the buffer memory; and checking an abnormal condition of the buffer memory by recording predetermined data on the buffer memory, by reading out the data, and by comparing the predetermined data with the read-out data.

* * * * *

UNITED STATES PATENT AND TRADEMARK OFFICE
CERTIFICATE OF CORRECTION

PATENT NO. : 5,664,094

DATED : September 2, 1997

INVENTOR(S): SHIGEYUKI TANIWA ET AL.

It is certified that error appears in the above-identified patent and that said Letters Patent is hereby corrected as shown below:

ON TITLE PAGE AT ITEM [76]

"[76] Inventors: Shigeyuki Taniwa; Ichiro Iida, both c/o Canon Kabushiki Kaisha 3-30-2, Shimomaruko, Ohta-ku, Tokyo, Japan" should read --[75] Inventors: Shigeyuki Taniwa, Yokohama; Ichiro Iida, Tokyo, both of Japan--.

ON TITLE PAGE AT [57] ABSTRACT

Line 12, "on" should read --an--.

COLUMN 1

Line 15, "diagarm" should read --diagram--.

COLUMN 2

Line 42, "demolulated" should read --demodulated--
Line 56, "ODC" should read --ODC4A.--.

UNITED STATES PATENT AND TRADEMARK OFFICE
CERTIFICATE OF CORRECTION

PATENT NO. : 5,664,094

DATED      : September 2, 1997

INVENTOR(S): SHIGEYUKI TANIWA ET AL.

Page 2 of 2

It is certified that error appears in the above-identified patent and that said Letters Patent is hereby corrected as shown below:

<u>COLUMN 3</u>

Line 51, "effeciently" should read --efficiently--.

<u>COLUMN 10</u>

Line 35, "in formation" should read --information--.

Signed and Sealed this

Fifteenth Day of September, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,664,094
DATED : Sept. 2, 1997
INVENTOR(S) : Shigeyuki Taniwa, et al It is certified that error appears in the above-identified patent and that said Letters Patent is hereby corrected as shown below:

Title page, insert item [73] Assignee:
--Canon Kabushiki Kaisha, Tokyo, Japan--

Signed and Sealed this

Third Day of November, 1998

*Attest:*

BRUCE LEHMAN

*Attesting Officer*  Commissioner of Patents and Trademarks